United States Patent [19]
Burgett

[11] 3,867,418

[45] Feb. 18, 1975

[54] EUROPIUM COMPLEX OF 1,1,1,2,2,6,6,7,7,7-DECAFLUORO-3,5-HEPTANEDIONE

[75] Inventor: Charles A. Burgett, Ames, Iowa

[73] Assignee: Iowa State University Research Foundation, Inc., Ames, Iowa

[22] Filed: Nov. 19, 1973

[21] Appl. No.: 416,751

Related U.S. Application Data

[63] Continuation of Ser. No. 253,986, May 17, 1972, abandoned.

[52] U.S. Cl......... 260/429.2, 260/593 H, 23/230 M
[51] Int. Cl. ............................................. C07f 5/00
[58] Field of Search ................................. 260/429.2

[56] References Cited
OTHER PUBLICATIONS

Shigematsu et al., Chem. Abs., Vol. 68, 118869x, p. 11460, (1968).

Schribner, Chem. Abs., Vol. 69, 62005p, p. 5807, (1968).

Rondeau et al., J. Am. Chem. Soc., Vol. 93, pp. 1522–1524, (1971), (QD 1A5).

Burgett et al., J. Mag. Res., Vol. 8, pp. 87 to 90, (1972).

Richardson et al., Inorg. Chem., Vol. 10, pp. 498 to 504, (1971).

*Primary Examiner*—Leland A. Sebastian

[57] ABSTRACT

A paramagnetic shift reagent, consisting of the europium (Eu) complex of 1,1,1,2,2,6,6,7,7,7-decafluoro-3,5-heptanedione [H(FHD)], said complex having the general formula $Eu(FHD)_3$.

1 Claim, No Drawings

EUROPIUM COMPLEX OF 1,1,1,2,2,6,6,7,7,7-DECAFLUORO-3,5-HEPTANEDIONE

RELATED APPLICATION

This is a continuation application of copending application Ser. No. 253,986, filed May 17, 1972, now abandoned.

BACKGROUND AND SUMMARY

The present invention is concerned with a new paramagnetic shift reagent prepared from a new composition of matter, i.e., 1,1,1,2,2,6,6,7,7,7-decafluoro-3,5-heptanedione, H(FHD). Specifically, the new compound is of the formula:

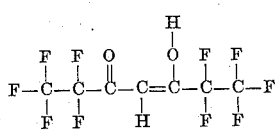

It has been discovered that the compound exhibits improved properties as a ligand in lanthanide paramagnetic shift reagents for use in Nuclear Magnetic Resonance Spectroscopy (NMR).

The prior art is replete with references disclosing the use of β-diketones as ligands in lanthanide paramagnetic shift reagents. In general, the presently available ligands consist of partially fluorinated or non-fluorinated β-diketones, which are complexed with lanthanide metals to form the shift reagent.

However, shift reagents heretofore available are deficient in several important respects. First, the very fact that they are only partially fluorinated offers a built in interference to spectra interpretation from the resonance of the protons contained in the reagents themselves. Also the existing reagents normally contain bulky substituent groups such as t-butyl and the like which inhibit the attainment of maximum paramagnetic shifts, by way of stereochemical interference. Finally, the shift reagents of the prior art are oftentimes relatively insoluble, which hinders their effective use in NMR analyses.

In contrast to this, the new compound disclosed herein is fully fluorinated and thus presents no interferences from proton resonances. It is also void of bulky substituents and thus presents no stereochemical interferences. And most importantly, it is extremely soluble in $CCl_4$ and $CDCl_3$ in the presence of the substrate; therefore maximum obtainable shifts for the substrates are realized to aid in elucidating complicated NMR spectra.

DETAILED DESCRIPTION

In outline form, the synthesis of the compound used to form the paramagnetic shift reagent of the present invention is accomplished by the following six-step procedure:

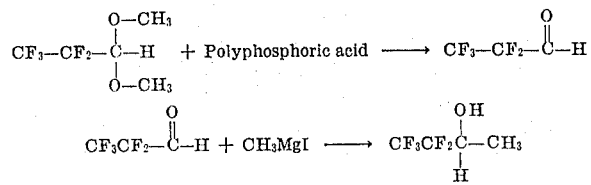

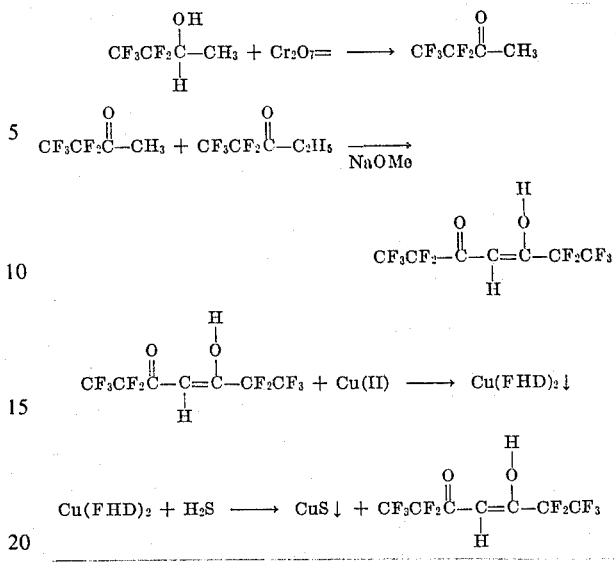

After this ligand is synthesized it can be complexed with a lanthanide to form a NMR shift reagent: normally all lanthanides are capable of forming such complexes. This procedure generally comprises combining a solution of the ligand H(FHD) neutralized with methanolic NaOH with a solution of a rare earth nitrate dissolved in a minimum of methanol. The resulting solution is then added to a tenfold excess of water with constant stirring and dropwise addition. The hydrated complex is precipatated out as a yellow oil which is dissolved in methylene chloride and recrystalized. The purified complex is then dried in vacuo to recover the anhydrous form. A specific example of the synthesis of the ligand and resulting complex follows. As shown by the following examples, the ligand H(FHD) forms a complex with europium (Eu) which has the general formula $Eu(FHD)_3$ and which is useful as a paramagnetic shift reagent.

EXAMPLE I

The ligand H(FHD) was synthesized in the following manner. The Grignard reagent ($CH_3MgI$) was prepared by adding 20 g Mg(0.8 mole) to 300 ml of absolute anhydrous ethylether (Baker), in a three necked round bottom 1 liter flask. The flask was fitted with a water cold reflux condenser, a motor driven propeller stirrer and a 100 ml addition flask. 114 g (0.8 mole), of methyl iodide was placed in the addition flask and then added dropwise to the Mg-ether mixture with constant stirring. A slow reflux was maintained by heating the mixture with a heating mantle during the addition of methyl iodide. After all the methyl iodide was added reflux was maintained for 1 hour. The resultant reagent was allowed to cool over night.

The addition funnel was removed from the 3 necked round bottom flask containing the Grignard reagent and replaced with a ¼ inch gas delivery tube. The water reflux condenser was replaced with a dry ice acetone cold finger. The other end of the gas delivery tube was fitted to a 500 ml round bottom flask containing 100 ml of polyphosphoric acid. A thermometer and 100 ml addition flask were fitted to the flask. The polyphosphoric acid was heated with stirring to 150°–180°C. 100 g of perfluoropropionaldehyde methyl hemiacetal was placed into the addition flask and added dropwise over a 5 hour period. The resultant perfluoropropionaldehyde was vaporized and delivered to the Grignard mixture via the gas delivery tube and mixed with constant stirring. After addition was complete the gas delivery tube was replaced with a glass stopper and the reaction mixture in the 1 liter flask was refluxed for 45 minutes. The mixture was then cooled and hydrolyzed by pouring over cracked ice and acidifying with 10% $H_2SO_4$. Their resultant solution was extracted four times with ether. The ether extracts were then dried over night over $CaCl_2$.

The alcohol was then distilled, the fraction boiling between 70° and 83°C was collected, with a yield of 91 percent. The alcohol was thereafter added to 150 ml of glacial acetic acid in a 3 necked round bottom 1 liter flask. The flask was fitted with a water cooled condenser, the stirrer and the addition flask. Sodium dichromate was prepared by dissolving 150 g of sodiumdichromate in 104 ml of sulfuric acid and 250 ml of water. The dichromate solution was placed in the addition flask and added dropwise over a one half hour period, with rapid stirring. The mixture was allowed to cool over night.

The desired ketone was rectified from the mixture, the fraction boiling between 38°–39°C was collected and dried over sodium sulfate, yield was 48 percent.

A two liter three necked round bottom flask was dried and fitted with a stirrer, water reflux condenser and addition flask. 150 ml of absolute ether (Baker) and 12 g (0.22 mole) of sodium methoxide was added. 42 g (0.22 mole) of ethyl perfluoropropionate was placed in the addition flask and added dropwise to the stirred mixture over a period of 40 minutes, and a cream colored solution resulted. 0.22 moles of the ketone were diluted with 50 ml of absolute ether and placed in the addition flask. The ketone was then added dropwise over a period of 1 hour. The mixture was allowed to stir for 2 hours and then refluxed for one-half hour. After refluxing 100 ml of 2 M sulfuric acid was added. The ether layer was collected and the aqueous layer was extracted three times with ether. The combined ether extracts were then washed with a saturated aqueous solution of copper (II) acetate. The resultant green $Cu(FHD)_2$ complex was then extracted into the ether layer and placed in an evaporating dish and evaporated to dryness. The dried, green solid was then dissolved in absolute ether. $H_2S$ was then bubbled through the solution resulting in the precipitation of copper sulfide and release of H(FHD). The solution was filtered and the pure ligand 1,1,1,2,2,6,6,7,7,7-decafluoro-3,5-heptanedione was distilled, the fraction boiling at 97°–98°C was collected, yield 42 percent.

To prepare the europium shift reagent, 5.0 of $Eu_2O_3$ was dissolved in conc. $HNO_3$ and evaporated to dryness yielding the europium nitrate hexahydrate. 10.12 g of H(FHD) was dissolved in approximately 5 ml of absolute methanol and 8.01 ml of 4.12 $\overline{M}$ NaOH was added to the methanolic solution. 4.9 g (0.011 $\overline{M}$) of Eu nitrate was dissolved in a minimum amount of methanol, the pH was adjusted to 4–6 (pH paper) using 4.12 $\overline{M}$ NaOH. The two solutions were combined and formed a homogeneous mixture. The mixture was then added to 100 ml of $H_2O$ dropwise over a one half hour period with rapid stirring. The complex formed a yellow oil which was separated from the aqueous layer. The oil was then dissolved in methylene chloride and recrystalized, the resultant solid was fragile and was dried in vacuo for 24 hours. The final yield was 92 percent.

The complexes produced by the methods outlined above are useful in elucidating complicated NMR spectra. This is accomplished by the shift reagent complexing with and thus changing the chemical-magnetic environment of the resonance species (most often protons) within the molecule. This induces a "shift" on the NMR spectrum from the position that the resonance species would normally occupy. In this way complicated spectra with bunched peaks can be resolved and further analyzed. A discussion of these principles and NMR in general can be found in 53JPOS669 and *Principles of Organic Chemistry* by J. O. Roberts and M. C. Caserio, pp. 43–51.

In the following two examples the europium complex [$Eu(FHD)_3$] is used as a shift reagent in the NMR spectra of simple substrates. Generally a greater shift is effected for protons $\alpha$ and $\beta$ to the basic functional group of the substrate, but there is considerable shift for all resonance species.

EXAMPLE II

Di-n-butyl ether was selected as the substrate and the [$Eu(FHD)_3$] complex was employed as a shift reagent. Because of the symmetry of this substrate molecule, the shift for protons on the terminal carbon atoms of each butyl chain is identical as well as for each symetrical set of protons on the carbons of the respective butyl chains. The following shift data was found from NMR spectra with tetramethylsilane as a standard, using two separate shift reagent/substrate ratios. All runs were made using a Varian A60 NMR Spectrometer under the following conditions: ambient temperature, filter band width of 0.08 mg, sweep time of 250 seconds, sweep width of 500 cps, sweep offset of 0.0 cps, spectrum amp. of 5.0.

Table I

Shift data for Di-n-butyl ether in $CCl_4$ solution

| Shift reagent Substrate | $H_1(H_8)^a$ | $H_2(H_7)^a$ | $H_3(H_6)^a$ | $H_4(H_5)^a$ |
|---|---|---|---|---|
| 0.19 | 0.30 | 0.55 | 1.24 | 1.32 |
| 0.36 | 0.54 | 1.07 | 2.19 | 2.41 |

$^a$The numbering for $n(Bu)_2O$ is as follows:
$C_1$-$C_2$-$C_3$-$C_4$-O-$C_5$-$C_6$-$C_7$-$C_8$

EXAMPLE III

A similar group of experiments were performed using 5-nonanone as substrate with the [$Eu(HFD)_3$] shift reagent. The results are given in table II. All spectrometer conditions were identical with Example II except that an R.F. Field of 0.07 mg and a spectrum amp. of 8.0 was utilized.

TABLE II

Shift data for 5-nonanone in $CCl_4$ solution shift reagent

| Substrate | $H_1(H_9)^a$ | $H_2(H_8)^a$ | $H_3(H_7)^a$ | $H_4(H_6)^a$ |
|---|---|---|---|---|
| 0.06 | 0.09 | 0.07 | 0.60 | 0.72 |
| 0.13 | 0.24 | 0.40 | 1.29 | 1.68 |
| 0.30 | 0.46 | 0.91 | 2.40 | 3.25 |
| 0.56 | 0.86 | 1.84 | 4.50 | 6.24 |
| 0.75 | 0.97 | 2.07 | 5.09 | 6.97 |
| 0.98 | 1.11 | 2.44 | 5.89 | 8.17 |

$^a$ The numbering is:

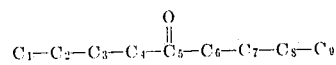

I claim:
1. A paramagnetic shift reagent, consisting of the europium (Eu) complex of 1,1,1,2,2,6,6,7,7,7-decafluoro-3,5-heptanedione [H(FHD)], said complex having the general formula Eu(FHD)$_3$.